(12) United States Patent
Liscouet (10) Patent No.: US 12,269,578 B2
(45) Date of Patent: *Apr. 8, 2025

(54) SYSTEMS AND METHODS FOR CONTROLLING A RESISTIVE FORCE OF AN INCEPTOR OF AN AIRCRAFT

(71) Applicant: BOMBARDIER INC., Dorval (CA)

(72) Inventor: Jonathan Liscouet, Montréal (CA)

(73) Assignee: BOMBARDIER INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,980

(22) Filed: Jul. 17, 2023

(65) Prior Publication Data

US 2023/0356827 A1   Nov. 9, 2023

Related U.S. Application Data

(63) Continuation of application No. 17/132,555, filed on Dec. 23, 2020, now Pat. No. 11,745,856.

(60) Provisional application No. 62/955,018, filed on Dec. 30, 2019.

(51) Int. Cl.
*B64C 13/04* (2006.01)
*B64C 13/46* (2006.01)

(52) U.S. Cl.
CPC .............. *B64C 13/04* (2013.01); *B64C 13/46* (2013.01); *B64C 13/0421* (2018.01)

(58) Field of Classification Search
CPC ..... B64C 13/04; B64C 13/46; B64C 13/0421; B64C 13/0423; B64C 13/345; B64C 13/507
See application file for complete search history.

(56) References Cited

U.S. PATENT DOCUMENTS

| | | |
|---|---|---|
| 5,746,398 A | 5/1998 | Rollet et al. |
| 8,025,256 B2 | 9/2011 | Miller et al. |
| 8,104,720 B2 | 1/2012 | Hirvonen et al. |
| 9,446,838 B2 | 9/2016 | Buethe et al. |
| 2007/0235594 A1 | 10/2007 | Wingett et al. |
| 2017/0017241 A1 | 1/2017 | Gillett et al. |
| 2017/0190410 A1 | 7/2017 | Good et al. |
| 2017/0341734 A1 | 11/2017 | Faucon et al. |

(Continued)

FOREIGN PATENT DOCUMENTS

EP   3443431 A2   2/2019

OTHER PUBLICATIONS

Examination Report for EP Patent Application No. 20217490.0 dated Dec. 19, 2022 issued by European Patent Office.

*Primary Examiner* — Rodney A Bonnette
(74) *Attorney, Agent, or Firm* — Norton Rose Fulbright Canada LLP (57) ABSTRACT

Methods and systems for adjusting a force feel profile of an inceptor of an aircraft are provided. The force feel profile is based on a baseline value of an operating parameter of the aircraft and defines an amount of resistive force applied to the inceptor as a function of displacement of the inceptor. An embodiment of the method includes receiving data indicative of a current value of the operating parameter. Based on a difference between the current value and the baseline value of the operating parameter, a portion of the force feel profile corresponding to a range of displacement values is shifted to adjust an amount of resistive force defined by the portion of the force feel profile for the range of displacement values.

18 Claims, 8 Drawing Sheets

(56) References Cited

U.S. PATENT DOCUMENTS

2019/0176969 A1 6/2019 Zierten et al.
2020/0198766 A1 6/2020 Dee et al.

SYSTEMS AND METHODS FOR CONTROLLING A RESISTIVE FORCE OF AN INCEPTOR OF AN AIRCRAFT

CROSS-REFERENCE TO RELATED APPLICATIONS

The present application is a continuation of U.S. patent application Ser. No. 17/132,555 filed Dec. 23, 2020, which claims priority to U.S. provisional patent application No. 62/955,018 filed on Dec. 30, 2019, the entire contents of both of which are incorporated herein by reference.

TECHNICAL FIELD

The disclosure relates generally to aircraft, and more particularly to aircraft inceptors.

BACKGROUND

Over the years, flight control systems have evolved from simple cable systems, where the pilot had to provide the force to overcome the aerodynamic hinge moments on the control surfaces, to today's fly-by-wire (FBW) systems, where computers signal surface actuators to provide a closed loop maneuver trajectory in response to pilot inputs. Aircraft that employ a FBW system typically have passive inceptors such as passive sidesticks to permit the pilots to control the aircraft. Compared to older cable systems, the passive inceptors of FBW systems provide reduced situational awareness for the pilot. Improvement is desirable.

SUMMARY

In one aspect, the disclosure describes a method of controlling a resistive force of an inceptor of an aircraft according to a force feel profile based on a baseline value of an operating parameter of the aircraft and defining an amount of resistive force applied to the inceptor as a function of displacement of the inceptor. The method comprises:
receiving data indicative of a current value of the operating parameter;
based on a difference between the current and baseline values of the operating parameter, shifting a portion of the force feel profile corresponding to a range of displacement values to adjust the amount of resistive force defined by the portion of the force feel profile for the range of displacement values; and
controlling the resistive force of the inceptor according to the force feel profile including the shifted portion.

The operating parameter may be indicative of an inertial parameter of the aircraft.

The operating parameter may be indicative of an acceleration.

The operating parameter may be indicative of a load on a flight control surface of the aircraft.

A gradient of the portion of the force feel profile may be unchanged based on the difference between the current and baseline values of the operating parameter.

The force feel profile may define a soft stop at a soft stop displacement value. The soft stop displacement value may be unchanged based on the difference between the current and baseline values of the operating parameter.

The portion of the force feel profile may be shifted within a prescribed boundary.

The portion of the force feel profile may be shifted by an adjustment amount determined using a product of a constant and the difference between the current and baseline values of the operating parameter.

The portion of the force feel profile may be a first portion of the force feel profile. The range of displacement values may be a first range of displacement values. The force feel profile may include a second portion corresponding to a second range of displacement values greater than the first range of displacement values. The method may include leaving the second portion of the force feel profile unchanged based on the difference between the current and baseline values of the operating parameter.

The portion of the force feel profile may be a first portion of the force feel profile. The range of displacement values may be a first range of displacement values. The force feel profile may include a second portion corresponding to a second range of displacement values greater than the first range of displacement values. The method may include shifting the second portion of the force feel profile based on the difference between the current and baseline values of the operating parameter to adjust an amount of resistive force defined by the second portion of the force feel profile for the second range of displacement values.

The operating parameter may be a first operating parameter. The force feel profile may be based on a baseline value of a second operating parameter of the aircraft. The first operating parameter may be different from the second operating parameter.

The method may comprise:
receiving data indicative of a current value of the second operating parameter of the aircraft; and
based on a difference between the current and baseline values of the second operating parameter, shifting the portion of the force feel profile corresponding to the range of displacement values to adjust an amount of resistive force defined by the portion of the force feel profile for the range of displacement values.

The portion of the force feel profile may be shifted by an adjustment amount. The adjustment amount may be determined using:
a product of a first constant and the difference between the current and baseline values of the first operating parameter; and
a product of a second constant and a difference between the current and baseline values of the second operating parameter, the first constant being different from the second constant.

Embodiments may include combinations of the above features.

In another aspect, the disclosure describes a system for controlling a resistive force of an inceptor of an aircraft according to a force feel profile based on a baseline value of an operating parameter of the aircraft and defining an amount of resistive force applied to the inceptor as a function of displacement of the inceptor. The system comprises:
one or more data processors operatively coupled to an actuator configured to apply the resistive force to the inceptor; and
non-transitory machine-readable memory storing instructions executable by the one or more data processors and configured to cause the one or more data processors to:
receive data indicative of a current value of the operating parameter; and
generate an output configured to cause the actuator to apply the resistive force to the inceptor according to the force feel profile including a portion shifted to adjust an amount of resistive force defined by the portion for a range of displacement values based on a difference between the current and baseline values of the operating parameter.

The operating parameter may be indicative of an inertial parameter of the aircraft.

The operating parameter may be indicative of an acceleration.

The operating parameter may be indicative of a load on a flight control surface of the aircraft.

A gradient of the portion of the force feel profile may be unchanged based on the difference between the current and baseline values of the operating parameter.

The force feel profile may define a soft stop at a soft stop displacement value. The soft stop displacement value may be unchanged based on the difference between the current and baseline values of the operating parameter.

Embodiments may include combinations of the above features.

In a further aspect, the disclosure describes a method of controlling a resistive force of an inceptor of an aircraft according to a force feel profile defined as a two-dimensional graph having a first axis representing displacement values for the inceptor and a second axis representing corresponding resistive force values applied to the inceptor. The force feel profile may be based on a baseline value of an operating parameter of the aircraft. The method comprises:

receiving a current value of the operating parameter;
based on a difference between the current and baseline values of the operating parameter, shifting a portion of the baseline force feel profile along the second axis; and
controlling the resistive force of the inceptor according to the force feel profile including the shifted portion.

The operating parameter may be indicative of an inertial parameter of the aircraft.

The operating parameter may be indicative of an acceleration.

The operating parameter may be indicative of a load on a flight control surface of the aircraft.

A position of the portion of the force feel profile along the first axis may be unchanged based on the difference between the current and baseline values of the operating parameter.

The portion of the force feel profile may be shifted within a prescribed boundary.

A gradient of the portion of the force feel profile may be unchanged based on the difference between the current and baseline values of the operating parameter.

The force feel profile may define a soft stop at a soft stop displacement value. The soft stop displacement value may be unchanged based on the difference between the current and baseline values of the operating parameter.

The portion of the force feel profile may be a first portion of the force feel profile corresponding to a first range of the displacement values. The force feel profile may include a second portion corresponding to a second range of the displacement values greater than the first range of the displacement values. The method may include leaving the second portion of the force feel profile unchanged based on the difference between the current and baseline values of the operating parameter.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes systems and methods useful for controlling a resistive force of an inceptor of an aircraft based on a current situation of the aircraft. The systems and methods described herein may be used to control the resistive force on the inceptor substantially in real-time based on an operating parameter of the aircraft during flight and thereby enhance situational awareness for the pilot.

One disclosed method includes shifting a portion of a force feel profile corresponding to a range of displacement values to adjust an amount of force defined by the portion of the force feel profile for the range of displacement values. The force feel profile may be based on a baseline/typical value of the operating parameter of the aircraft. Shifting the portion of the force feel profile may be based on a difference between a current value of the operating parameter and the baseline value of the operating parameter. In some embodiments, the operating parameter may be an inertial parameter and/or a (e.g., air) load exerted on a flight control surface of the aircraft.

The term "substantially" as used herein may be applied to modify any quantitative representation which could permissibly vary without resulting in a change in the basic function to which it is related.

Figure 1A:
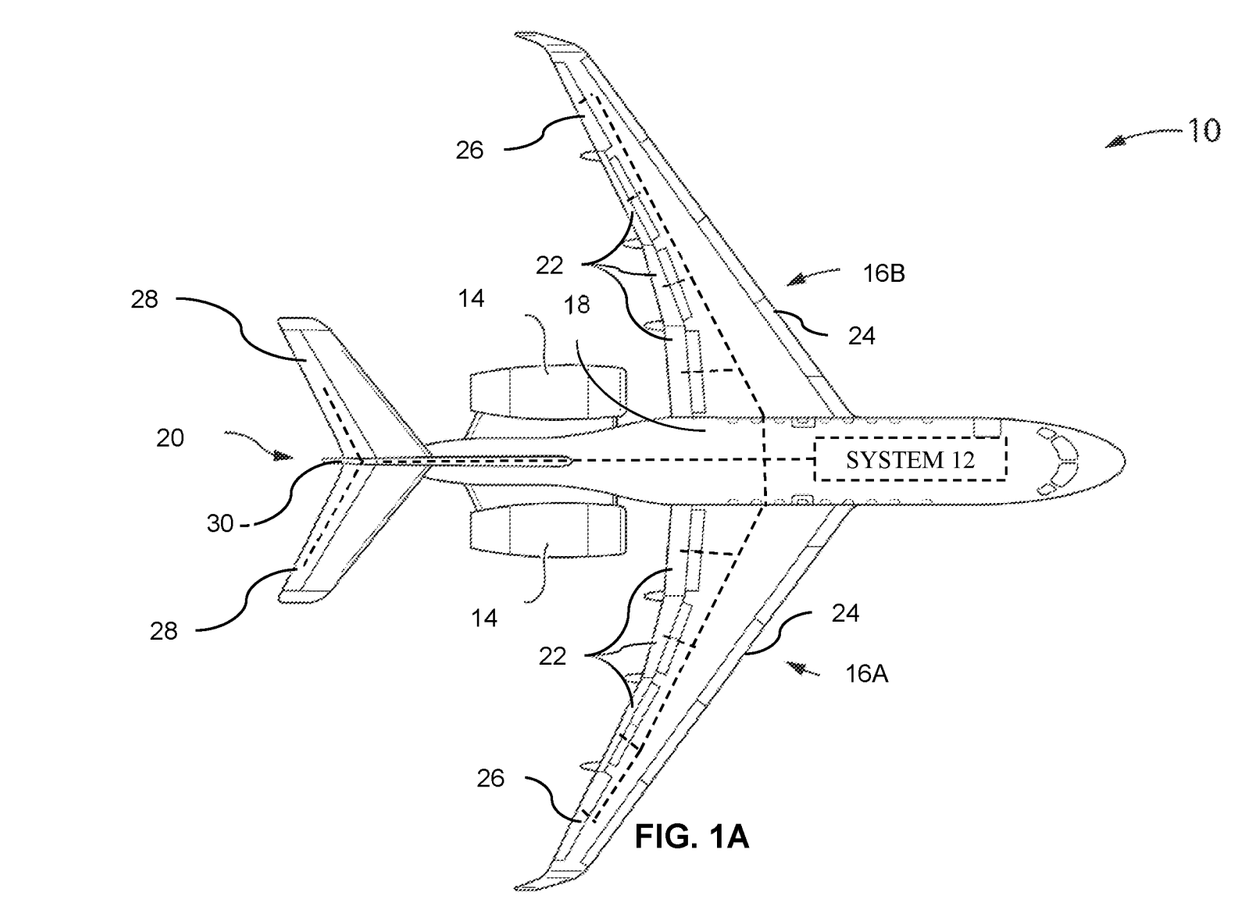
FIG. 1A is a top plan view of an exemplary aircraft including a system for controlling the aircraft during flight.
Figure 1B:
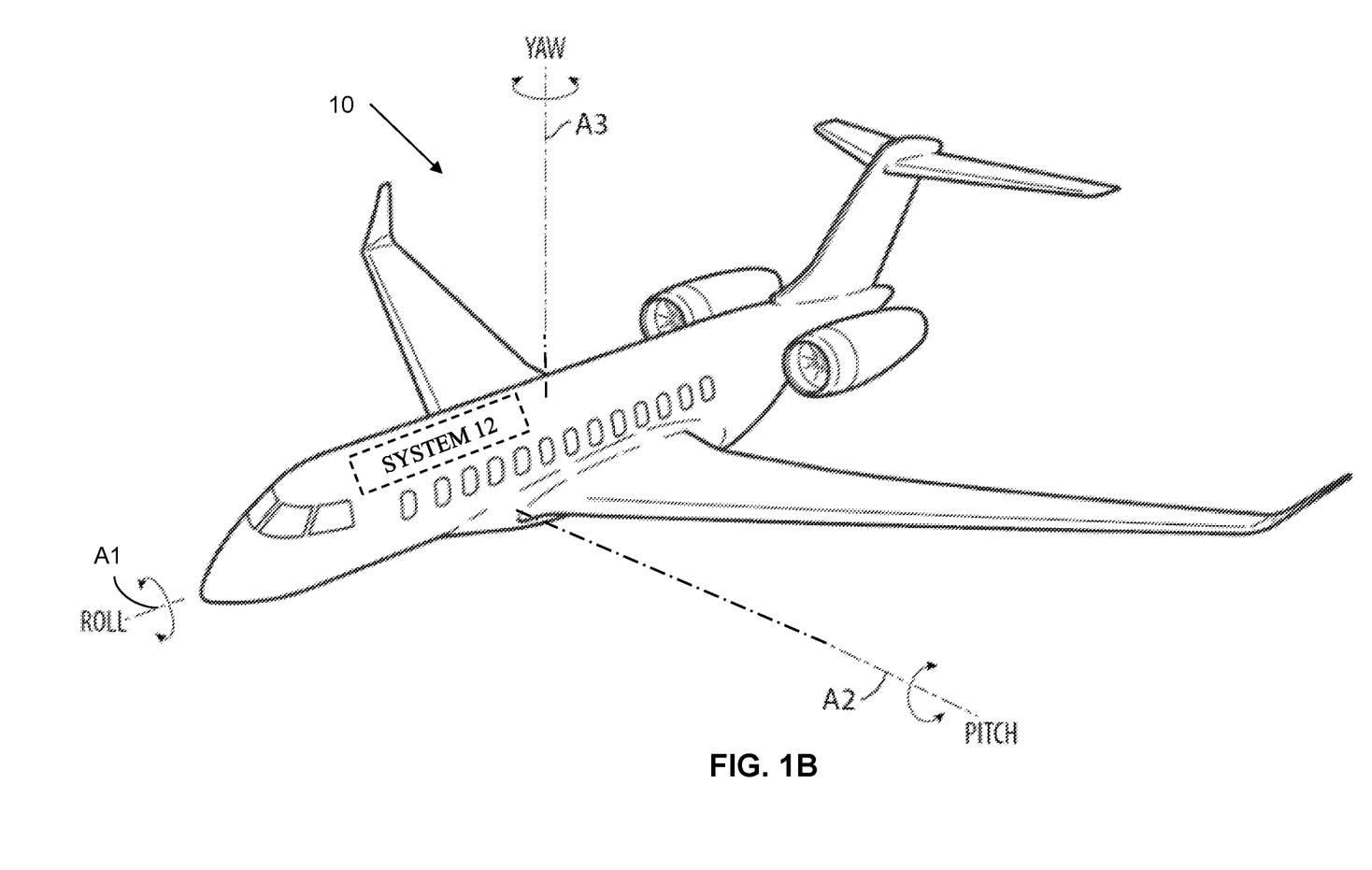
FIG. 1B is a perspective view of the aircraft of FIG. 1A showing principal axes of rotation of the aircraft.

FIG. 1A is a top plan view of an exemplary aircraft 10 including system 12 (shown schematically) for controlling movement of aircraft 10 during flight. FIG. 1B is a perspective view of aircraft 10 showing principal axes of rotation of aircraft 10. Aircraft 10 may be any type of aircraft such as corporate, private, commercial and passenger aircraft suitable for civil aviation. Aircraft 10 may be manned or unmanned (e.g., drone). For example, aircraft 10 may be a (e.g., ultra-long range) business jet or a narrow-body, twin-engine jet airliner. Aircraft 10 may be a fixed-wing aircraft comprising one or more engines 14. Alternatively, aircraft 10 may be a glider with no engines.

In reference to FIG. 1A, aircraft 10 may have wings 16A, 16B (referred generally herein as "wings 16"), fuselage 18 and empennage 20. One or more of engines 14 may be mounted to fuselage 18. Alternatively, or in addition, one or more of engines 14 may be mounted to wings 16. Aircraft 10 may include any known or other suitable flight control surfaces configured to interact with air flowing around aircraft 10 during flight. Control system 12 may be operatively coupled to such flight control surfaces. The flight control surfaces may include trailing edge flaps 22, leading edge slats 24, ailerons 26, elevators 28, rudders 30 and spoilers for example. Ailerons 26 may be considered primary flight control surfaces that cause aircraft 10 to rotate about longitudinal axis A1 (see FIG. 1B) during flight. In other words, movement of ailerons 16 in flight may cause aircraft 16 to roll. Elevators 28 may be considered primary flight control surfaces that cause aircraft 10 to rotate about horizontal or lateral axis A2 (see FIG. 1B) during flight. In other words, movement of elevators 28 in flight may cause aircraft 16 to pitch up or down. Rudder 30 may be considered a primary control surface that causes aircraft 10 to yaw or rotate about vertical axis A3 (see FIG. 1B). Rudder 30 may provide directional control and thus point the nose of aircraft 10 in the direction desired.

Figure 2:
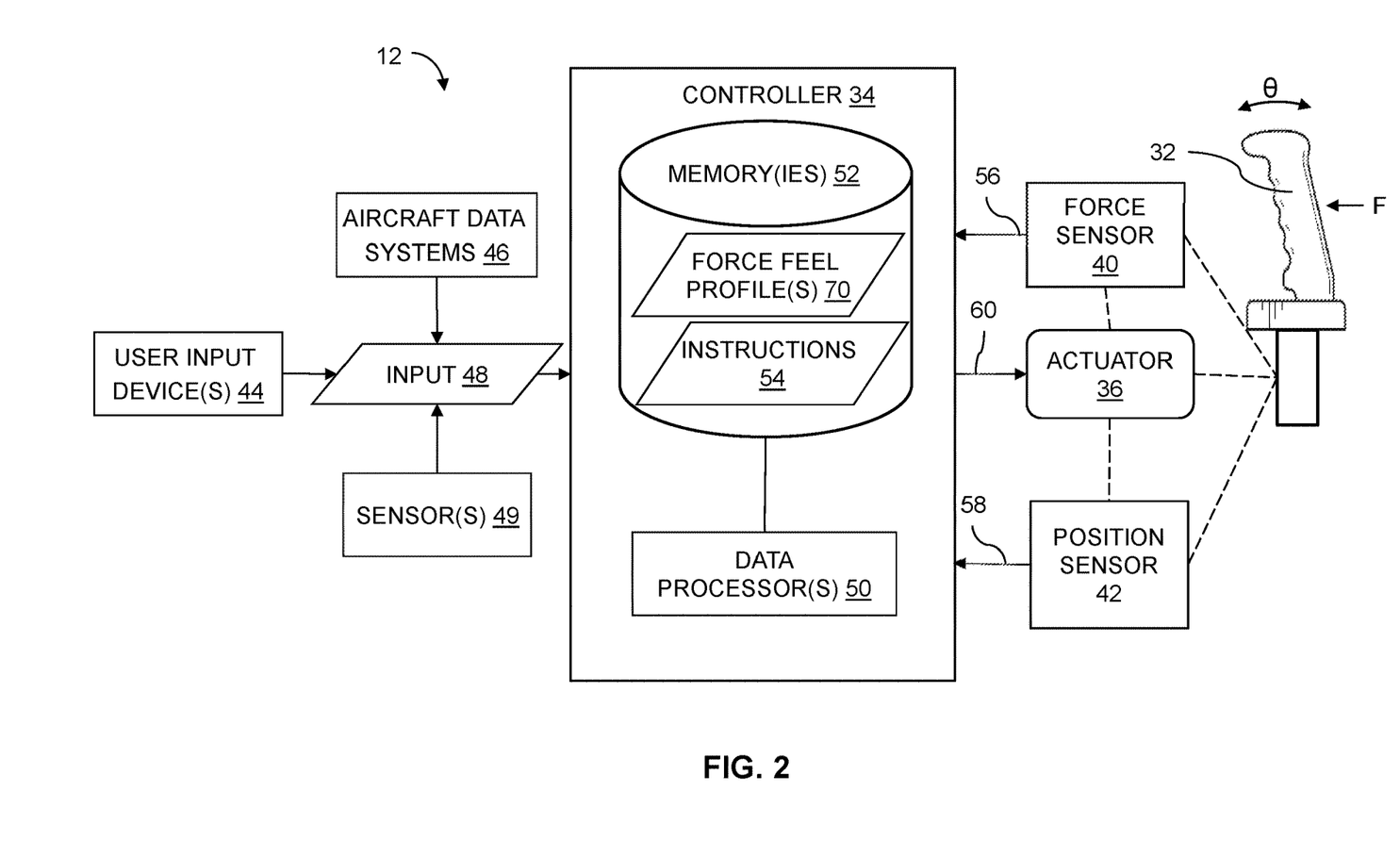
FIG. 2 is a schematic diagram of a system for controlling a resistive force of an inceptor of the aircraft.

FIG. 2 is a schematic diagram of an exemplary system 12 that may be used for controlling a resistive force of inceptor 32 of aircraft 10. System 12 may include inceptor 32, controller 34, actuator 36, force sensor 40, position sensor 42, and one or more user input devices 44 (referred hereinafter in the singular).

Inceptor 32 may receive manual input forces from a human user (e.g., pilot). Although inceptor 32 is depicted as a side stick of aircraft 10, it should be understood that inceptor 32 may be another type of inceptor such as a yoke or rudder pedals for example. Inceptor 32 may be a sidestick or yoke used to control a pitch and/or roll of aircraft 10, or pedals used to control a yaw of aircraft 10 during flight.

Figure 3:
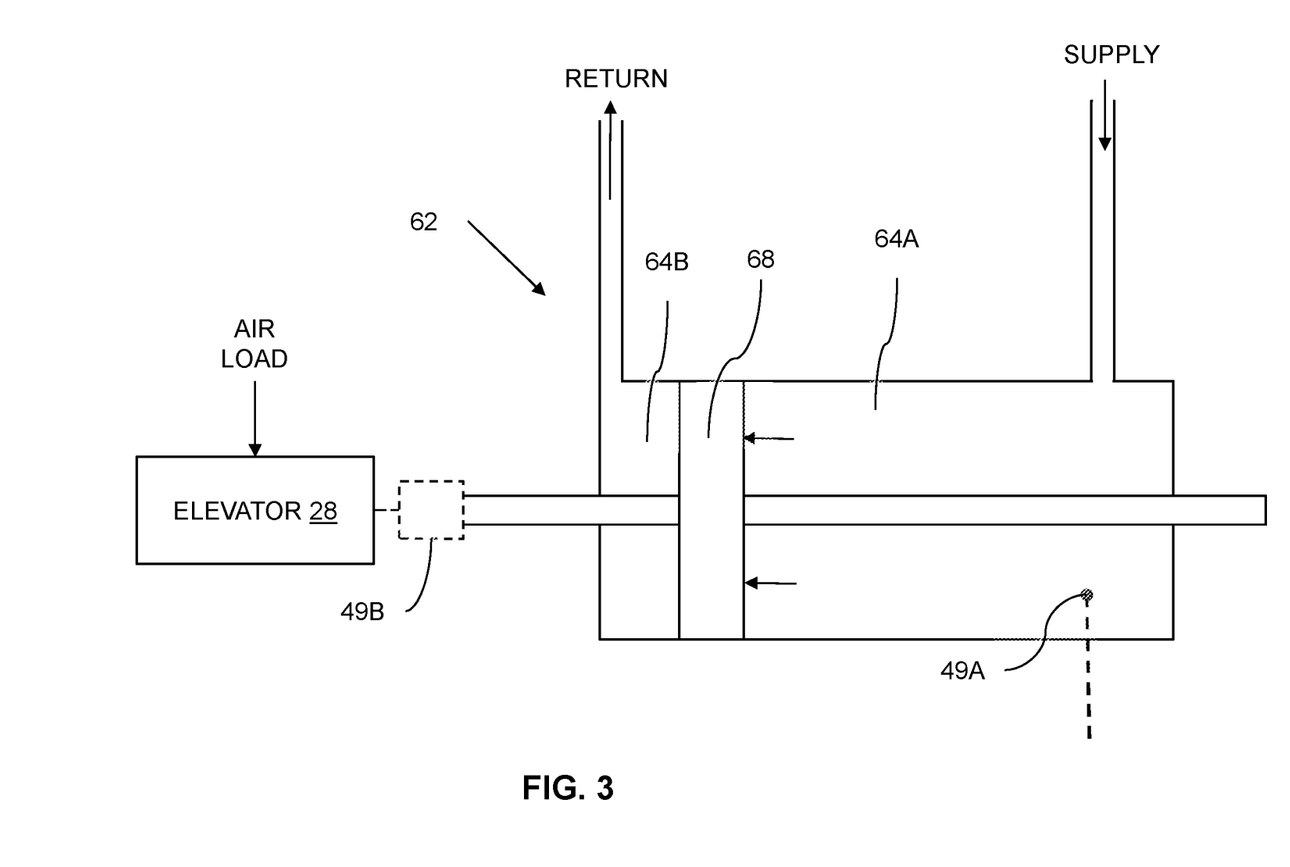
FIG. 3 is a schematic diagram of an exemplary actuator coupled to an elevator of an aircraft.

Controller 34 may be configured to control the resistive force of inceptor 32 based on force feel profile 70 (shown in FIG. 3). Controller 34 may be configured to receive input 48 (i.e. signals) from user input device 44 and/or one or more data systems 46 (referred herein after in the singular) and/or one or more sensors 49 (referred hereinafter in the singular) via one or more communication terminals/ports. Controller 34 may receive input 48 on a substantially continuous basis or intermittently so that the data may be available to controller 34 substantially in real-time. Controller 34 may include one or more data processors 50 (referred hereinafter in the singular) and one or more computer-readable memories 52 (referred hereinafter in the singular) storing machine-readable instructions 54 executable by the data processor 50 and configured to cause data processor 50 to generate one or more outputs for causing the execution of steps of the methods described herein.

Data processor 50 may include any suitable device(s) configured to cause a series of steps to be performed by controller 34 so as to implement a computer-implemented process such that instructions 54, when executed by controller 34 or other programmable apparatus, may cause the functions/acts specified in the methods described herein to be executed. Data processor 50 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 52 may include any suitable machine-readable storage medium. Memory 52 may include non-transitory computer readable storage medium such as, for example, but not limited to, an electronic, magnetic, optical, electromagnetic, infrared, or semiconductor system, apparatus, or device, or any suitable combination of the foregoing. Memory 52 may include a suitable combination of any type of computer memory that is located either internally or externally to controller 34. Memory 52 may include any storage means (e.g. devices) suitable for retrievably storing machine-readable instructions 54 executable by data processor 50.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 52) having computer readable program code (e.g., instructions 54) embodied thereon. Computer program code for carrying out operations for aspects of the present disclosure in accordance with instructions 54 may be written in any combination of one or more programming languages. Such program code may be executed entirely or in part by controller 34 or other data processing device(s). Based on the present disclosure, one skilled in the relevant arts could readily write computer program code for implementing the methods described herein.

Aircraft data systems 46 may include an air data computer configured to compute current inertial parameters such as calibrated airspeed, (e.g., vertical) acceleration, Mach number and altitude from acquired sensed data such as from a pitot-static system or inertial reference unit of aircraft 10 for example. The inertial parameters computed by the air data computer may be communicated to controller 34.

Sensor 49 may be operatively coupled to a flight control surface of aircraft 10 or a mechanism for adjusting a position of a flight control surface of aircraft 10. The flight control surface may be ailerons 26, elevators 28 and/or rudder 30. Data indicative of a load exerted on a flight control surface during flight may be communicated from sensor 49 to controller 34. An exemplary system used to acquire data indicative of a load exerted on elevators 28 of aircraft 10 is depicted in FIG. 3 and described further below.

Force sensor 40 may be configured to generate signal 56 indicative of force F exerted on inceptor 32. In various embodiments, force sensor 40 may include a load cell, piezoelectric sensor and/or a strain gauge for example. Force sensor 40 may be operatively coupled to a structural member that is a load path between inceptor 32 and actuator 36.

Actuator 36 may be operatively coupled to inceptor 32 to apply a resistive force to inceptor 32 in response to the pilot applying a force to cause movement of inceptor 32. Actuator 36 may be an electric motor for example. An output drive of actuator 36 may be coupled to inceptor 32 via a suitable mechanical reduction system (e.g., gearing). In some embodiments, actuator 36 could include a magnetic bearing arrangement operatively coupled to inceptor 32 and operable to supply a variable magnetic feedback force to inceptor 32 in a direction that opposes the displacement direction.

Position sensor 42 may be operatively coupled to provide signal 58 that is indicative of a position 8 of inceptor 32. Position sensor 42 may be directly or indirectly coupled to inceptor 32. In some embodiments, position sensor 42 may be coupled to actuator 36. Position sensor 42 may be configured to detect a position of the output drive of actuator 36 coupled to inceptor 32. Signal 58 may be provided to controller 34. In various embodiments, position sensor 32 may include a potentiometer, a linear or rotary encoder, and/or a linear or rotary variable differential transformer for example.

In some embodiments, actuator 36 may be configured to drive inceptor 32 to cause movement of inceptor 32 in response to force F applied to inceptor 32 by the pilot. For example, actuator 36 may be operatively coupled to cause inceptor 32 to reach a certain position 8 corresponding to a magnitude of the force F applied to inceptor 32.

Controller 34, actuator 36, force sensor 40 and position sensor 42 may define a feedback control loop for controlling the resistive force and/or position of inceptor 32. For example, based on input 48, force signal 56 and position signal 58, controller 34 may be configured to generate and transmit output signal 60 to actuator 36 via wired connections for example. Controller 34 may use force feel profile 70 stored in memory 52 to determine a position of inceptor 32 corresponding to force F applied to inceptor 32 measured via force sensor 40. The determined displacement may then be used by controller 34 to determine a desired trajectory of inceptor 32. Based on the desired trajectory of inceptor 32, controller 34 may be configured to generate output signal 60 to cause actuator 36 to control inceptor 32 to follow the desired trajectory. Positional feedback received from position sensor 42 may be used to generate output signal 60 and execute the positional adjustment of inceptor 32 according to the applied force F while providing an equal but opposite resistive force on inceptor 32.

Suitable systems for controlling and driving movement of inceptor 32 are disclosed is U.S. Pat. No. 9,090,337 B2 titled APPARATUS AND METHOD FOR CONTROLLING A FORCE-ACTIVATED CONTROLLER, which is incorporated herein by reference.

FIG. 3 shows an exemplary actuator 62 mechanically coupled to elevator 28 as an example of a flight control surface. An air load may be exerted on elevator 28 during flight, resisting deployment of elevator 28. Actuator 62 may be coupled to elevator 28 to provide a force that counters the air load to hold elevator 28 at a desired position or to cause further deployment of elevator 28. As depicted, actuator 62 is hydraulic but it is understood that other types of actuators such as electric or pneumatic may also be suitable. Hydraulic fluid may fill chambers 64A, 64B defined by cylinder on opposite sides of piston 68. In the illustrated embodiment, a supply hydraulic pressure supplied to chamber 64A to hold or cause deployment of elevator 28 may be indicative of the air load exerted on elevator 28. Accordingly, sensor 49 may be pressure sensor 49A configured to provide a signal indicative of the air load on elevator 28 to controller 34. A similar arrangement could be used for a pneumatic actuator. For an electric motor, sensor 49 could measure a current supplied to the motor as an indication of the air load on elevator 28. Alternatively or in addition, a suitable load cell 49B could be installed in a load path between actuator 62 and elevator 28 to measure a force indicative of the air load applied to elevator 28.

Figure 4:
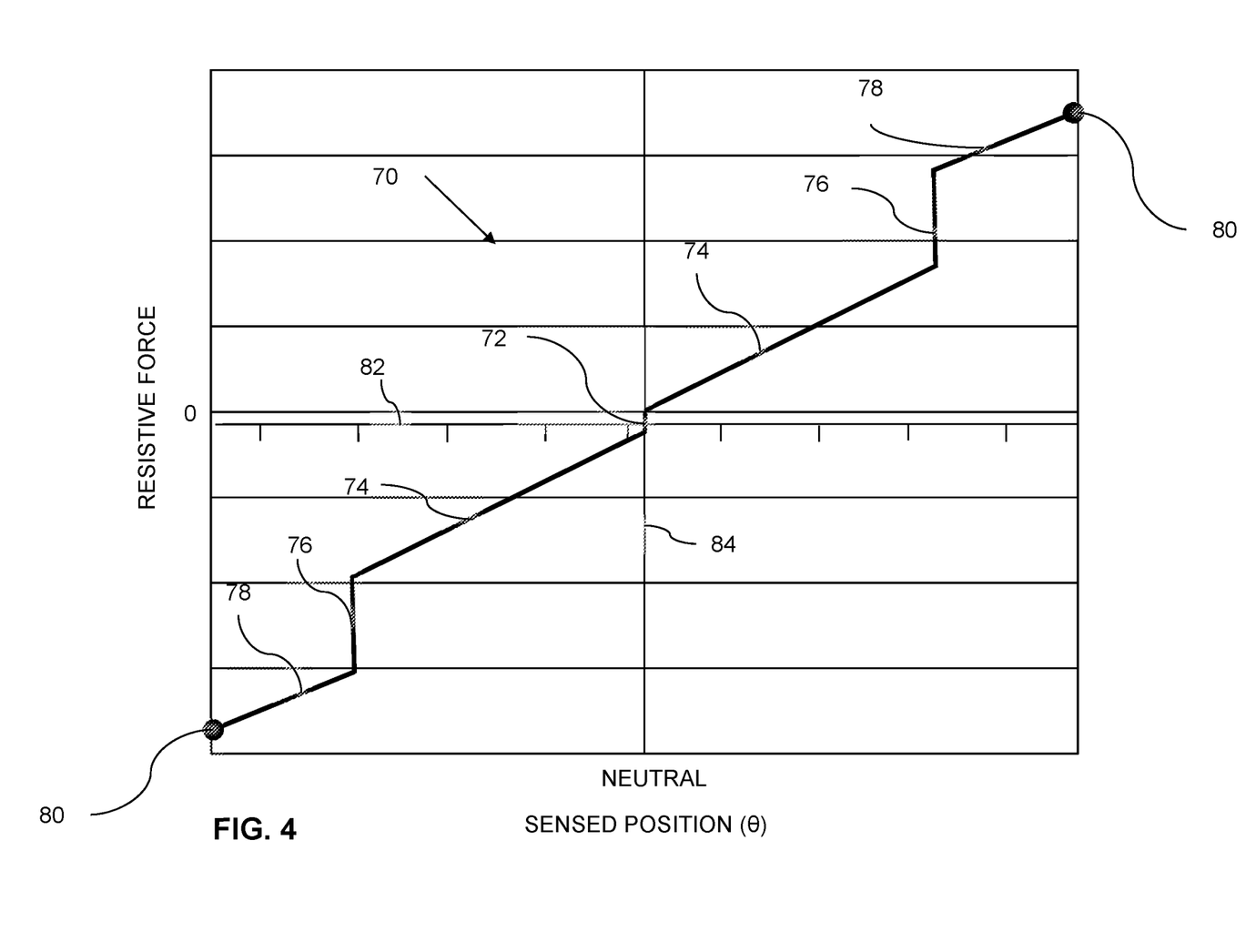
FIG. 4 is a two-dimensional graph of an exemplary force feel profile defining an amount of resistive force applied to the inceptor of FIG. 2 as a function of a position of the inceptor from a neutral position.

FIG. 4 is a two-dimensional graph of an exemplary force feel profile 70 illustrating a relationship between the resistive force exerted on inceptor 32 and a corresponding position 8 of inceptor 32 for both positive and negative displacements of inceptor 32 relative to the neutral position. This force versus displacement relationship may implement proprioceptive feedback. As depicted, force feel profile 70 may have first axis 82 (e.g., abscissa) representing positions of inceptor 32 and second axis 84 (e.g., ordinate) representing corresponding amounts of resistive force applied to inceptor 32. The measurement unit of force (i.e., second axis 84) in force feel profile 70 may be pound-force and the measurement unit of position 8 sensed position (i.e., first axis 82) in force feel profile 70 may be degrees. Force feel profile 70 may be stored in memory 52 of controller 34. In some embodiments, force feel profile 70 may be received by controller 34 from user input device 44 or otherwise. In alternate embodiments, force feel profile 70 may be generated by controller 34 based on input 48. It is understood that the systems and methods disclosed herein may be useful for adjusting force feel profiles that are different than force feel profile 70 illustrated herein and that define different gradients and portions.

Force feel profile 70 may include a plurality of portions including zero breakout 72, first gradient portion 74, soft stop 76, second gradient portion 78 and hard stop 80. Depending on the type of inceptor 32, force feel profile 70 may be symmetric or asymmetric about first axis 82. Similarly, depending on the type of inceptor 32, force feel profile 70 may be symmetric or asymmetric about second axis 84.

Breakout 72 may be located at a neutral (e.g., zero) position of inceptor 32 and may optionally define an infinite gradient, requiring the pilot to apply a breakout force above a desired threshold level to cause inceptor 32 to move from its zero or neutral position. Breakout 72 may provide a tactile cue to the pilot indicating when inceptor 32 is in the neutral position.

First gradient portion 74 may define a linear relationship between the resistive or applied force F and displacement of inceptor 32 from the neutral position such that the displacement increases with applied force F. Inceptor 32 may be biased to return to the neutral position in the absence or reduction of applied force F. Such biasing may be implemented by a centering spring.

Soft stop 76 may follow first gradient portion 74. Soft stop 76 may define an infinite or steep gradient in which little to no displacement of inceptor 32 occurs over a predefined range of applied force F. Soft stop 76 may define a gradient that is significantly steeper than first gradient portion 74. Soft stop 76 may be used to provide another tactile cue to the pilot indicating that the displacement of inceptor 32 is approaching a limit such as a boundary of a flight envelope of aircraft 10 for example.

Second gradient portion 78 may follow soft stop 76. Second gradient portion 78 may define a gradient that is slightly steeper than first gradient portion 74. Second gradient portion 78 may provide the pilot a tactile cue indicating that inceptor 32 is now beyond the soft stop position and the normal operating range defined by the extent of first gradient portion 74.

Hard stop 80 has a steep or infinite gradient and prevents further displacement of inceptor 32. Hard stop 80 may be a physical displacement limit of inceptor 32.

In some embodiments, controller 34 may implement a different force feel profile 70 for inceptor 32 for different phases of operation (i.e. taxi, takeoff, climb, cruise, approach and landing). For example, a force feel profile 70 for one phase of flight may be different than a force feel profile 70 for another phase of flight. In alternative embodiments, the same baseline force feel profile 70 may be used with inceptor 32 for all phases of flight.

Force feel profile 70 of inceptor 32 may be based on one or more baseline values of respective one or more operating parameters of aircraft 10. Such baseline value may be an average or typical value of the operating parameter of aircraft 10 during flight or a specific phase of flight. In some embodiments, a baseline value of an operating parameter may be received by controller 34 from user input device 44, aircraft data system 46 or sensor 49. In some embodiments, the baseline value of the operating parameter may be determined by controller 34 by conducting (e.g., statistical) analysis on received data from sensor 49 and/or aircraft data system 46. Controller 34 may be configured to generate force feel profile 70 based on the baseline value of the operating parameter. Generating force feel profile 70 may include adjusting a baseline force feel profile. Such baseline force feel profile may be stored in memory 52 in the form of rules, functions, look-up tables and/or numerical values for example.

The operating parameter may include an inertial parameter such as speed or acceleration along any direction of interest and/or the angular orientation of aircraft 10. Alternatively or in addition, the operating parameter may include airspeed, altitude and/or an air load exerted on a flight control surface of aircraft 10 during flight. The flight control surface may be ailerons 26, elevators 28 or rudder 30 for example.

Figure 5:
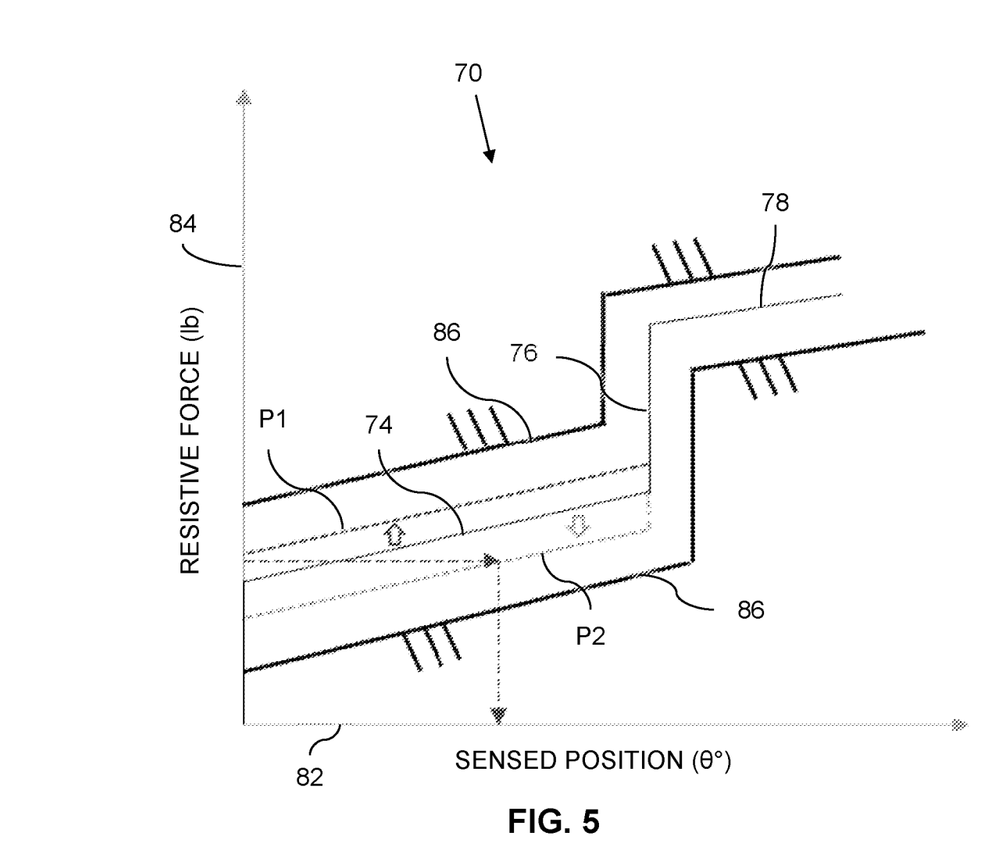
FIG. 5 is a two-dimensional graph of part of the force feel profile of FIG. 4 being modified to reflect current situations of the aircraft.

FIG. 5 graphically illustrates examples of ways of modifying a portion force feel profile 70 that is on the positive side of the neutral position. FIG. 5 illustrates first gradient portion 74 of force feel profile 70 being modified based on a current condition of aircraft 10. Force feel profile 70 may be modified substantially in real-time to reflect a current condition of aircraft 10 as determined by controller 34 based on one or more operating parameters of aircraft 10. As depicted, first gradient portion 74 may be shifted vertically along second axis 84 to adjust an amount of resistive force defined by first gradient portion 74 for a corresponding range of displacement values. As depicted, first gradient portion 74 may be shifted to higher position P1 or lower position P2 for example.

Shifting first gradient portion 74 along second axis 84 may involve leaving the gradient (i.e., slope) of first gradient portion 74 unchanged. Shifting first gradient portion 74 along second axis 84 may also involve leaving the gradient of soft stop 76 and the gradient of second gradient portion 78 unchanged. Shifting first gradient portion 74 along second axis 84 may also involve leaving the applicable range of applicable positions of first gradient portion 74 unchanged. In some embodiments, shifting first gradient portion 74 along second axis 84 may involve leaving second gradient portion 78 and hard stop 80 completely unchanged. In alternative embodiments, first gradient portion 74 and second gradient portion 78 may be shifted along second axis 84 while keeping the gradient and position of soft stop 76, and the gradient and position of second gradient portion 78 unchanged.

In some embodiments, the relationship between the force and displacement of inceptor 32 defined by first gradient portion 74 may be governed by Equation 1 below:

$$\text{Force} = \text{Breakout Force} + \text{constant } K \times \text{displacement value} \quad (1)$$

Equation 1 may provide the amount of resistive force applied to inceptor 32 for a given displacement value from the neutral position within the range of displacement values of first gradient portion 74. A value of the breakout force and constant K may vary based on a phase of flight of aircraft 10. The range of displacement values corresponding to the first gradient of force feel profile 70 may also vary based on a phase of flight of aircraft 10.

When force feel profile 70 is based on an operating parameter, shifting first gradient portion 74 along second axis 84 may occur when a current value of the operating parameter is different than a baseline value of the operating parameter. In various embodiments, the operating parameter may be an inertial parameter of aircraft 10 or a load exerted on a flight control surface of aircraft 10 for example. During flight, controller 34 may continuously receive input 48. The received data may be indicative of a current value of the operating parameter. In some cases, the received data may include data for determining the current value of the operating parameter by controller 34. For instance, the pressure readings from sensor 49A may be used by controller 34 to determine a current load exerted on elevators 28 (shown in FIG. 3). In this example, the operating parameter governing force feel profile 70 may be a load exerted on elevators 28.

Shifting first gradient portion 74 of force feel profile 70 may involve adjusting the value of a breakout force of Equation 1 by an adjustment amount. The breakout force of force feel profile 70 which is based on a baseline value of an operating parameter is referred to as a baseline breakout force hereinafter. The baseline breakout force may be shifted by controller 34 by an adjustment amount based on a difference between the current value and baseline value of the operating parameter. In some embodiments, an adjusted breakout force reflecting current conditions of the aircraft may be determined using Equation 2 below:

$$\text{Adjusted Breakout Force} = \text{baseline breakout force} + \text{constant } C \times (\text{current value of operating parameter} - \text{baseline value of operating parameter}) \quad (2)$$

In Equation 2, the adjustment amount is equal to a product of a constant C and the difference between the current value and the baseline value of the operating parameter. A value of constant C may vary depending on the operating parameter. Constant C may be determined empirically by considering human factors and by using data acquired from flight simulations/tests in order to provide suitable situational awareness for the pilot based on the change(s) in value of the applicable operational parameter(s).

In some embodiments, force feel profile 70 may be based on a baseline value of a first operating parameter and a baseline value of a second operating parameter of aircraft 10. The first operating parameter may be different than the second operating parameter. The first operating parameter or second operating parameter may be an inertial parameter or a (e.g., air) load exerted on a flight control surface of aircraft 10. For instance, force feel profile 70 may be based on a typical load (or range of loads) exerted on elevators 28 and a typical acceleration (or range of acceleration) of aircraft 10 during a cruise phase of flight. In the case of a force feel profile 70 associated with rotation of aircraft 10 about lateral (pitch) axis A2, the one or more operating parameters of interests may include a vertical acceleration, sometimes referred to as $N_z$, of aircraft 10 and/or the air load on one or more elevators 28.

Received data by controller 34 may be indicative of a current value of the first operating parameter and a current value of the second operating parameter. The baseline breakout force may be increased or decreased based on a difference between the current value and baseline value of the first operating parameter and a difference between the current value and baseline value of the second operating parameter. In some embodiments, the adjusted breakout force reflecting current conditions of the aircraft may be determined using Equation 3 below:

Adjusted Breakout Force=baseline breakout force+
constant $C_1$×(current value of first operating
parameter−baseline value of first operating
parameter)+constant $C_2$×(current value of second operating parameter−baseline value of second operating parameter)    (3)

In Equation 3, the adjustment amount is equal to a summation of a product of constant $C_1$ and the difference between the current value and the baseline value of the first operating parameter and a product of constant $C_2$ and the difference between the current value and the baseline value of the second operating parameter. A value of constant $C_1$ may be different than a value of constant $C_2$. A value of constant $C_1$ may be determined based on a type of the first parameter. A value of constant $C_2$ may be determined based on a type of the second parameter. Both $C_1$ and $C_2$ may be determined empirically by considering human factors and by using data acquired from flight simulations/test in order to provide suitable situational awareness for the pilot based on the change(s) in value of the applicable operational parameter(s).

It is understood that shifting of one or more portions of force feel profile 70 may be carried out based on a current value of a single operating parameter of aircraft 10 or based on a combination/blend of two or more current values of two or more operating parameters of aircraft 10. In some embodiments, shifting of one or more portions of force feel profile 70 may be carried out based solely on an acceleration of aircraft 10. In some embodiments, shifting of one or more portions of force feel profile 70 may be carried out based on a combination of the acceleration of aircraft 10 and another operating parameters. In some embodiments, shifting of one or more portions of force feel profile 70 may be carried out based solely on a load on a flight control surface of aircraft 10. In some embodiments, shifting of one or more portions of force feel profile 70 may be carried out based on a combination of the load on a flight control surface of aircraft 10 and one or more other operating parameters.

As illustrated in FIG. 5, first gradient portion 74 may be shifted to be within prescribed boundary 86. Prescribed boundary 86 may be set to ensure that the breakout force of inceptor 32 is within a desired range of force values. The desired range of force values may be determined by considering human factors and by using data acquired from flight simulations and/or test. Upper and lower prescribed boundaries 86 may be determined to provide a suitable dynamic range along second axis 84 for shifting first gradient portion 74 and provide suitable situational awareness for the pilot.

Alternatively or in addition, second gradient portion 78 of force feel profile 70 may be similarly modified to reflect a current condition of aircraft 10. Second gradient portion 78 may be shifted along second axis 84 to adjust an amount of resistive force defined by second gradient portion 78 for a corresponding range of displacement values. When force feel profile 70 is based on an operating parameter, second gradient portion 78 may be shifted by an adjustment amount that is based on a difference between a current value and baseline value of the operating parameter. In some embodiments, second gradient portion 78 may be shifted along second axis 84 together with first gradient portion 74 and breakout 72. In alternative embodiments, shifting second gradient portion 78 along second axis 84 may involve leaving first gradient portion 74 and breakout 72 unchanged.

Figure 6:
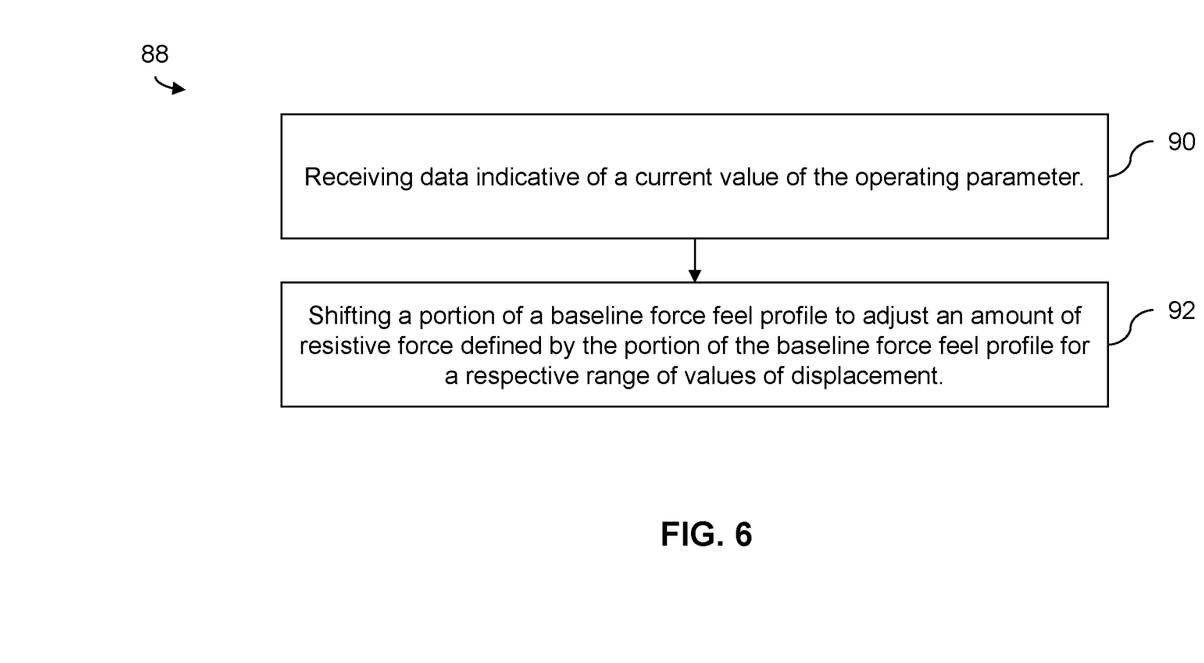
FIG. 6 is a flowchart illustrating an exemplary method for adjusting a force feel profile of an inceptor of an aircraft.

FIG. 6 is a flowchart illustrating an exemplary method 88 for adjusting force feel profile 70 of inceptor 32 of aircraft 10. Force feel profile 70 may be based on a baseline value of an operating parameter of aircraft 10 and defining an amount of resistive force applied to inceptor 32 as a function of displacement of inceptor 32. Method 88 may be performed using system 12 described herein or using another system. It is understood that aspects of method 88 may be combined with aspects of other methods described herein. In various embodiments, method 88 includes:

receiving data indicative of a current value of the operating parameter (see block 90); and     based on a difference between the current value and the baseline value of the operating parameter, shifting a portion of the force feel profile corresponding to a range of displacement values to adjust an amount of resistive force defined by the portion of the force feel profile for the range of displacement values (see block 92).

The data indicative of the current value of the operating parameter may be received from aircraft data system 46 or sensor 49 substantially in real-time. The operating parameter may be indicative of an inertial parameter of aircraft 10 or a load on flight control surface of aircraft 10.

In some embodiments, the portion of force feel profile 70 may be shifted by an adjustment amount determined using a product of a constant and the difference between the current value and the baseline value of the operating parameter.

In some embodiments, the portion of force feel profile 70 may be a first portion of force feel profile 70 corresponding to a first range of displacement values and force feel profile 70 may also include a second portion corresponding to a second range of displacement values that is greater than the first range of displacement values. The first portion of force feel profile 70 may be first gradient portion 74 and the second portion of force feel profile 70 may be second gradient portion 78. A gradient of the first portion and a gradient of the second portion of force feel profile 70 may be unchanged based on the difference between the current value and the baseline value of the operating parameter. In some embodiments, the method may include leaving the second portion of force feel profile 70 unchanged based on the difference between the current value and the baseline value of the operating parameter. In alternative embodiments, method 88 may include shifting the second portion of force feel profile 70 based on the difference between the current value and the baseline value of the operating parameter.

In some embodiments, the operating parameter is a first operating parameter and force feel profile 70 is also based on a baseline value of a second operating parameter of aircraft 10. The first operating parameter may be different than the second operating parameter. Method 88 may include shifting the portion of the force feel profile by an adjustment amount. The adjustment amount may be determined using: a product of a first constant and the difference between the current value and baseline value of the first operating parameter; and a product of a second constant and a difference between the current value and baseline value of the second operating parameter.

In some embodiments, force feel profile 70 of inceptor 32 is a first force feel profile for controlling inceptor 32 during a first phase of flight of aircraft 10. The method may also include controlling inceptor 32 according to a second force feel profile during a second phase of flight.

Figure 7:
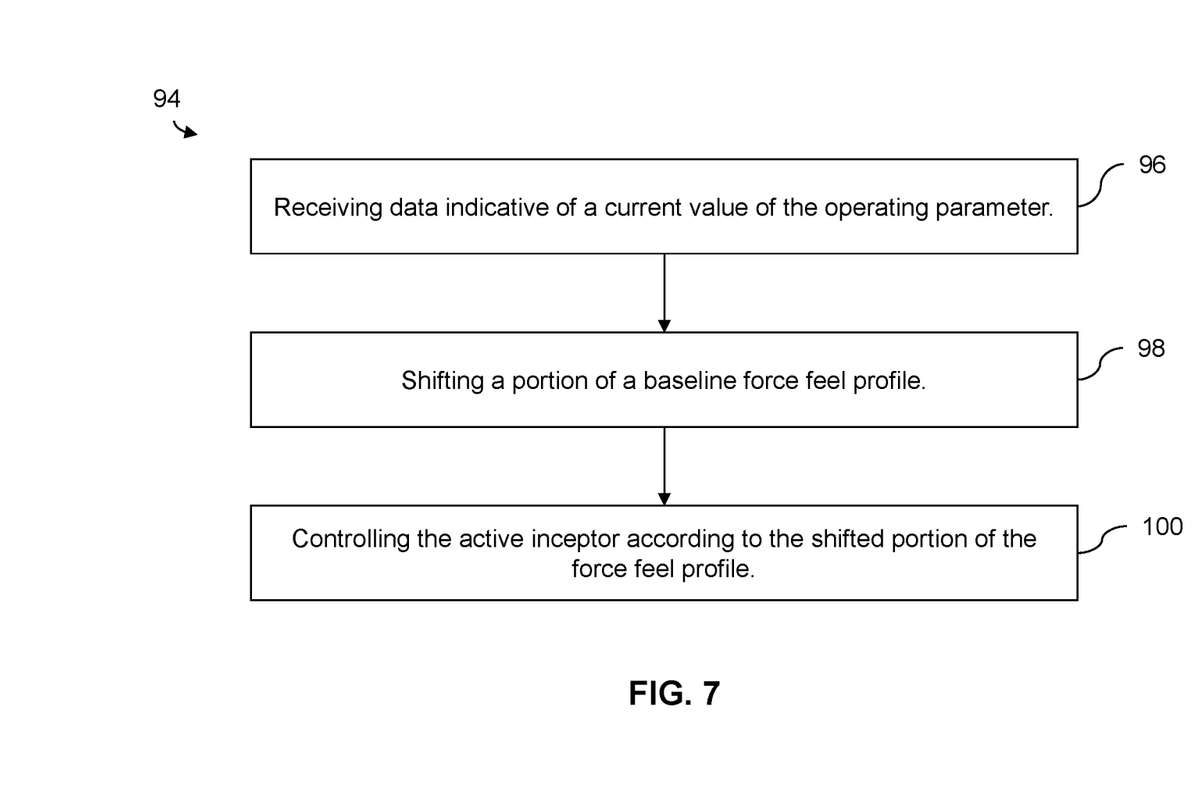
FIG. 7 is a flowchart illustrating an exemplary method for controlling an inceptor of an aircraft according to a force feel profile.

FIG. 7 is a flowchart illustrating an exemplary method 94 of controlling inceptor 32 of aircraft 10 according to force feel profile 70 defined as a two-dimensional graph having first axis 82 representing displacements of the inceptor and second axis 84 representing corresponding amounts of force applied to the inceptor. Force feel profile 70 is based on a baseline value of an operating parameter of aircraft 10. Method 94 may be performed using system 12 described herein or using another system. It is understood that aspects of method 94 may be combined with aspects of other methods described herein. In various embodiments, method 94 includes:

receiving data indicative of a current value of the operating parameter (see block 96);

based on a difference between the current value and the baseline value of the operating parameter, shifting a portion of the baseline force feel profile along the second axis (see block 98); and controlling the active inceptor according to the shifted portion of the force feel profile (see block 100).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A method of controlling a resistive force of an inceptor of an aircraft according to a force feel profile defined as a two-dimensional graph having a first axis representing displacement values for the inceptor and a second axis representing corresponding resistive force values applied to the inceptor, the force feel profile being based on a baseline value of a first operating parameter of the aircraft and on a baseline value of a second operating parameter of the aircraft different from the first operating parameter, the method comprising:

using a current value of the first operating parameter and a current value of the second operating parameter, shifting a portion of the force feel profile along the second axis by an amount determined using:
   a product of a first constant and a difference between the current and baseline values of the first operating parameter; and
   a product of a second constant and a difference between the current and baseline values of the second operating parameter, the first constant being different from the second constant; and controlling the resistive force of the inceptor according to the force feel profile including the shifted portion.

2. The method of claim 1, wherein the first operating parameter is indicative of an inertial parameter of the aircraft.

3. The method of claim 1, wherein the first operating parameter is indicative of an acceleration.

4. The method of claim 1, wherein the first operating parameter is indicative of a load on a flight control surface of the aircraft.

5. The method of claim 1, wherein a position of the portion of the force feel profile along the first axis is unchanged based on the difference between the current and baseline values of the first operating parameter.

6. The method of claim 1, wherein the portion of the force feel profile is shifted within a prescribed boundary.

7. The method of claim 1, wherein a gradient of the portion of the force feel profile is unchanged based on the difference between the current and baseline values of the first operating parameter.

8. The method of claim 1, wherein:
the force feel profile defines a soft stop at a soft stop displacement value; and
the soft stop displacement value is unchanged based on the difference between the current and baseline values of the first operating parameter.

9. The method of claim 1, wherein:
the portion of the force feel profile is a first portion of the force feel profile corresponding to a first range of the displacement values;
the force feel profile includes a second portion corresponding to a second range of the displacement values greater than the first range of the displacement values; and
the method includes leaving the second portion of the force feel profile unchanged based on the difference between the current and baseline values of the first operating parameter.

10. A system for controlling an inceptor of an aircraft according to a force feel profile defining an amount of resistive force applied to the inceptor as a function of displacement of the inceptor, the force feel profile being based on a baseline value of a first operating parameter of the aircraft and on a baseline value of a second operating parameter of the aircraft different from the first operating parameter, the system comprising:

an actuator configured to apply the resistive force to the inceptor;

one or more data processors operatively coupled to the actuator; and non-transitory machine-readable memory storing instructions executable by the one or more data processors and configured to cause the one or more data processors to:
   receive a current value of the first operating parameter and a current value of the second operating parameter; and
   cause the actuator to apply the resistive force to the inceptor according to the force feel profile including a portion of the force feel profile shifted by an amount determined using:
      a product of a first constant and the difference between the current and baseline values of the first operating parameter; and
      a product of a second constant and a difference between the current and baseline values of the second operating parameter, the first constant being different from the second constant.

11. The system of claim 10, wherein the first operating parameter is indicative of an inertial parameter of the aircraft.

12. The system of claim 10, wherein the first operating parameter is indicative of an acceleration.

13. The system of claim 10, wherein the first operating parameter is indicative of a load on a flight control surface of the aircraft.

14. The system of claim 10, wherein a range of displacement values for the inceptor for the portion of the force feel profile is unchanged based on the difference between the current and baseline values of the first operating parameter.

15. The system of claim 10, wherein the portion of the force feel profile is shifted within a prescribed boundary.

16. The system of claim 10, wherein a gradient of the portion of the force feel profile is unchanged based on the difference between the current and baseline values of the first operating parameter.

17. The system of claim 10, wherein:
- the force feel profile defines a soft stop at a soft stop displacement value; and
- the soft stop displacement value is unchanged based on the difference between the current and baseline values of the first operating parameter.

18. The system of claim 10, wherein:
- the portion of the force feel profile is a first portion of the force feel profile corresponding to a first range of displacement values for the inceptor;
- the force feel profile includes a second portion corresponding to a second range of displacement values for the inceptor greater than the first range of the displacement values; and
- the instructions are configured to cause the one or more data processors to leave the second portion of the force feel profile unchanged based on the difference between the current and baseline values of the first operating parameter.

\* \* \* \* \*